INVENTORS.
CARL D. ACKERMAN &
BY WILLIAM E. MOTT

ATTORNEY

INVENTORS.
CARL D. ACKERMAN &
BY WILLIAM E. MOTT

ATTORNEY

United States Patent Office ──

3,370,173
Patented Feb. 20, 1968

3,370,173
METHOD OF DETECTING AND/OR MEASURING INTERNAL LEAKAGE IN A PROCESS STREAM
Carl D. Ackerman, Indiana Township, Allegheny County, and William E. Mott, O'Hara Township, Allegheny County, Pa., assignors to Gulf Research & Development Company, Pittsburgh, Pa., a corporation of Delaware
Filed Mar. 19, 1964, Ser. No. 353,061
5 Claims. (Cl. 250—106)

Our invention relates to a method for detecting and, if desired, measuring internal leakage in continuous stream process systems such as in feed-effluent heat exchangers or catalyst beds.

External leakage in chemical process systems or equipment can generally be detected quite readily, such as, for example, by a visible leaking or an unaccounted decrease in volume of flow and/or flow rate. In the situation of internal leakage, however, detection is not quite so simple inasmuch as there is no leak which can be visibly observed from the exterior of the system, and generally there is usually no overall decrease in flow rate in the system as a whole. Typical of the types of internal leakage commonly encountered are internal leakage in a feed-effluent heat exchanger, bypassing the reaction zone in a reactor, and channelling of the reactant stream through a catalyst bed whereby in effect a substantial portion of the catalyst bed is bypassed. The effect of internal leakage or bypassing is to "short circuit" completely or partially a portion of the reactor system.

Generally in feed-effluent heat exchangers the feed material absorbs part of the heat energy contained in the effluent product by indirect heat exchange and the feed and effluent are kept separate so as to prevent commingling of the feed with the effluent. It is not uncommon in such systems to have a leak develop in the means separating the feed from the effluent, e.g., tubes, coils, etc., thereby permitting the feed to pass directly into the effluent stream. In the reaction vessel itself, it is also possible for a leak to develop in the shroud or liner of the reaction vessel thereby providing a path from the inlet through the insulation or other space surrounding the reactor bed directly to the outlet thereby bypassing or "short circuiting" the reactor bed. It is also possible for poor mechanical distribution of the feed stock to occur in a catalyst bed and permit the feed stock to be passed through a few channels within the catalyst bed rather than being distributed over the entire catalyst bed. Again, a portion of the reactor system is bypassed.

The difficulty of detecting internal leakage or bypassing is further increased in a continuous stream process, i.e., a process system wherein there is but one interconnected process stream from feedstream through to product effluent stream. In the situation of a process system having several independent process streams with one primary stream and another separate secondary stream employed in the same heat exchanger, the presence of a component from the primary stream in the secondary stream is definite evidence of internal leakage but where the secondary stream is merely the primary stream at a later stage of processing, e.g. the primary stream returns as the secondary stream after passing through a reactor, a path is provided for the tracer to reach the detector without passing through a leak. Thus, the presence of feed constituents in the product side of the system may be due not only to a leakage but also from incomplete conversion of the feed in the processing unit. Therefore, to detect such leakage or bypassing one would have to know the conversion which could be expected in the processing unit or reactor independent of any heat exchanger with which it might be associated and one would also be required to have extremely accurate means of analyzing both the feed and the product. Determination of any of the above parameters can be extremely complex and time-consuming. Thus, attempting to detect internal leakage or bypassing through the means of chemical analyses of feed and product becomes somewhat expensive, unwieldy and undesirable.

It has previously been suggested, such as, for example, in U.S. Patent 3,087,064, that these analytical problems might be overcome to some extent by the use of radioactive tracers. Such previously suggested methods, however, require complete conversion of the tracer in the reactor system to tracer-containing products which can be completely separated in the product effluent from the tracer of the feed. At best such systems involve the removal of a sample from the effluent stream followed by a separation of the converted tracer from the remainder of the effluent sample and then a detection of the radioactivity of the remaining sample. Such a method of detecting leakage still requires excessive manipulative steps and does not lend itself to uninterrupted operation of the process during the detection procedure.

By the terms "chemical process system" and "process system" as employed throughout the specification and claims is meant the unit or portion thereof, including the components of equipment, through which a stream of material is manipulated in order to effect a change in the stream. The particular change effected is not necessarily limited to those changes resulting from a chemical reaction, such as, for example, those changes occurring in hydrocracking, isomerization and polymerization processes, but also includes those changes which are physical in nature, such as, for example, those changes resulting from distillation, adsorption, absorption and physical phase separation processes.

It is an object of our invention to provide a method for detecting internal leakage or bypassing in a continuous stream chemical process system which does not require complex analyses of feed and product streams. It is also an object of our invention to provide such a method which functions without interruption of normal process system operations. These and other objects of our invention will become obvious from the description of the method of our invention contained herein.

Our invention comprises a method for detecting internal leakage or bypassing in a continuous stream chemical process or reactor system by injecting a radioactive tracer into the process stream at a point upstream from a point of possible or suspected leakage or bypassing. The tracer is then removed from the process stream or that portion of the process stream flowing through that portion of the reactor system which is possibly being "short circuited" by the suspected internal leakage or bypassing. The radioactivity, or more properly the above-background radioactivity, of the process stream is then detected at some point downstream from the place of possible or suspected internal leakage or bypassing. It will be seen, therefore, that the absence of internal leakage or bypassing allows complete removal of the tracer and, thus, no above-background radioactivity will be detected at a point downstream of the suspected area. On the other hand, if there is internal leakage or bypassing, the point at which the tracer is being removed from the process stream will be at least partially and perhaps completely "short circuited," thereby permitting the radioactive tracer to pass downstream of the suspected area where it is detected.

When applying the method of our invention to the detection of internal leakage in a feed-effluent heat exchanger of a chemical reactor system, i.e., one in which a reactant stream is passed successively through the feed side of the exchanger, another portion of the system and then the effluent side of the exchanger, our method comprises injecting a radioactive tracer into the process stream upstream of the feed side of the exchanger. The tracer is then removed from the process stream at some point downstream of the feed side of the exchanger and upstream of the effluent side of the exchanger, i.e., the tracer is removed from the process stream of some point after the feed stream initially leaves the heat exchanger and before it returns to the heat exchanger as the effluent stream. The above-background radioactivity of the stream leaving the effluent side of the exchanger is then detected at some point downstream from the exchanger. In this situation it will be seen that any above-background radioactivity detected downstream of the effluent side of the heat exchanger must come directly from the feed stream due to internal leakage through the heat exchanger.

When employing the method of our invention to detect bypassing in a processing vessel, a radioactive tracer, which tracer and its reaction products are capable of being completely retained in the processing vessel, is injected into the feed stream to the processing vessel. The feed stream together with the tracer is then passed into the inlet of the processing vessel. The effluent stream is removed from the outlet of the processing vessel and the above-background radioactivity of this effluent stream is then detected. Thus, when employing the method of our invention in this manner, the radioactive tracer in the feed stream passing through the processing vessel will be retained therein and removed from the stream and any above-background radioactivity detected from the effluent stream is the result of the feed stream or at least a portion thereof bypassing the processing vessel.

When employing the method of our invention, the particular radioactive nuclide which is used to tag the tracer must be an intrinsic tracer or be capable of forming a tracer compound compatible with the stream being traced and must have a minimum half-life sufficient to permit formation of the tracer compound and conduct of the test. Examples of such nuclides include, among others, bromine-82, cobalt-60, iron-59, sodium-24, zinc-65 and the radioactive isotopes of iodine such as, for example, iodine-131. Desirably, the radioactive nuclide selected should provide radiation of a minimum energy sufficient for easy detection. It will be understood, of course, that the nuclide selected should not provide such extensive radiation as to create an undue hazard to people in the area. Furthermore, since at least a portion of the radioactive material will be passed through the effluent stream to the product in the event that internal leakage or bypassing does exist, a radioactive nuclide having a sufficiently short half-life is also preferred, thereby eliminating prolonged contamination of the product. As mentioned above, however, a radioactive nuclide of sufficiently long half-life must also be employed. Generally we have found that a radioactive nuclide having a half-life in the range from about 6 hours up to about 30 days is acceptable. Preferably, however, a radioactive nuclide having a half-life from about 24 to about 48 hours is employed.

In one aspect of our invention wherein the radioactivity is detected externally of the system the nuclide must also be a gamma emitter and provide sufficient energy to penetrate the normally steel walls of the system.

The radioactive tagged tracer compound selected for employment in the method of our invention must be capable of being completely removed from the process stream. The methods of tracer removal will be discussed below but suffice it to say at this time that it is essential to the operation of our method that all of the tracer compound in the process stream passing through a particular portion of the process system must be removed therefrom by some method. In addition the tracer compound must be compatible with the process stream to be traced and must not have any deleterious effect on the process itself.

Generally, it is preferred to employ a tracer compound which matches as closely as possible the physical and chemical characteristics of the process stream, including, for example, solubility, boiling point and reactivity. When employing the method of our invention in a chemical reaction process, such as a catalytic process, the tracer compound should be selected so as not to be a poison for the catalyst nor in any way distort the essential reaction or reactions of the process. Further it is preferred that the tracer compound not be adsorbed on the surfaces of the system components. Illustrative of the types of compounds which can be employed as tracers in our invention are oil soluble metal chelates, Group I metal sulfonates and organo-halide compounds, particularly aromatic halides.

The means of removing radioactive tracer from the process streams in accordance with our invention can include the insertion in the process system at the appropriate place a tracer removal unit such as, for example, adsorbent beds, composed of appropriate materials, e.g., beds of spent catalyst, selected in accordance with the particular radioactive tracer employed. Thus, for example, if a radioactive halide tracer is employed, beds of finely divided silver can be incorporated in the processing stream as the tracer removal means. Advantageously, however, a tracer is selected which will be completely removed by some mechanism inherent in the processing system itself. Illustrative of this preferred arrangement is the employment of a tracer which is completely removed from the processing stream and is retained by the catalyst employed in the reactor bed. Thus, for example, when employing bromide-82 as the tracer, the tracer can be completely adsorbed on beds of catalyst including among others platinum or alumina and nickel-cobalt-molybdenum on alumina. Generally, adsorptive catalysts and catalyst bases such as, for example, silica-alumina, silica-magnesia and alumina-magnesia, are useful in such tracer removal operation. Other methods of removing the tracer compound can become more closely related to the selection of a tracer with particular physical characteristics. For example, in testing for internal leakage in a feed-effluent heat exchanger operated in connection with a distillation column the selection of a tracer boiling at or below the temperature range of the lower boiling components removed overhead from the column would allow removal of tracer from the liquid bottoms stream returned to the heat exchanger.

Also in accordance with our invention we can measure or estimate the extent of internal leakage or bypassing existing within a process system. To effect this measurement it is necessary to employ a quantity of tagged tracer of known radioactivity and to calibrate the detector means. Generally the detector means employed in the method of our invention comprises one of a type well-known in the art such as, for example, a scintillation or Geiger counter combined with any of other well-known totalizer devices which provide a totalization of the number of counts detected or conventional scalers and counting rate-meters which provide a record of counting rate as a function of time. The relationship existing between the radioactivity of the detected stream and the number of counts detected can be expressed by the equation $A=N/F$, wherein $A$=the radioactivity expressed in millicuries or microcuries, $N$=the total number of counts and F is the response characteristic, proportionality factor, or calibration factor which represents counts per unit time registered from a unit of radioactivity as, for example, counts per minute from one microcurie. Thus, when it is desired to perform a leak test in accordance with the method of our invention and the particular radio-active tracer and the quantity thereof to be employed has been selected, the calibration factor F for the given process system being tested can be determined by injecting a known quantity of the tracer compoudn into the effluent stream of the process system at a point as close as possible to the suspected leak location which simulates introduction of tracer into the effluent stream from the feed stream. This injection is, of course, upstream from the point of detection. The total number of amounts detected downstream from the suspected leak location is then recorded and the calibration factor F is determined from the relationship $F=n/a$ wherein F is the calibration factor, $a$ is the amount of radioactivity of the tracer injected and $n$ is the number of counts detected. (Lower case characters are used in this equation throughout the specification to indicate the quantities employed in calibration as opposed to actual testing.) Once this has been determined the scale of the counting device can be calibrated in accordance with the equation given above to read directly the percent bypass rather than total number of counts. The actual numerical values for the scale are obtained from the relationship $$Q = \frac{A}{A_o} Q_1$$

wherein $Q$=the leak rate, $Q_1$=the flow rate of the stream into which the tracer has been injected, $A_o$=the radioactivity of the tracer injected and $A$=the radioactivity detected in the effluent stream. This procedure takes into consideration a certain quantity of the tracer being adsorbed onto the surface of reaction system components. A more detailed description of this calibration procedure will be found in the examples below.

In order to measure the extent of internal leakage in accordance with our invention a radioactive tracer of predetermined radioactivity is selected and a known quantity of such tracer is injected into a process stream at a point upstream from a point of possible bypassing. The tracer is then removed from that portion of the process stream flowing through that portion of the system possibly being bypassed and the quantity of radioactivity of the process stream at a point downstream from the point of possible bypassing is detected. The quantity of the radioactivity detected is indicative of the extent of internal leakage or bypassing.

Alternatively, instead of injecting a known, discrete quantity of tracer into the process stream the radioactive tracer can be continuously injected into the process stream at a predetermined rate, and again, after the removal of the tracer from that portion of the process stream flowing through that portion of the system possibly being bypassed, the quantity of radioactivity detected downstream from the point of possible bypassing is indicative of the extent of internal leakage or bypassing. The calibration procedure employed with a continuous injection of radioactive tracer is slightly different from that described above due mainly to the continuous high rate of counts obtained downstream of the suspected leak. After the system has reached equilibrium the calibration injection is commenced and the downstream recording of radioactivity is commenced after the quantity of radioactivity has risen to a stable level. When an external detector is employed, the number of counts detected is recorded for an extended period of time and the average number of counts per unit of time together with the quantity of radioactive tracer injected per unit of time is employed in the equation $F=n/a$ to determine the calibration factor. The quantity of radioactivity detected per unit of time is then indicative of the extent of leakage. The employment of continuous injection can be advantageously used in a high velocity system which would preclude injection of separate slugs due to extensive mixing and dilution of the slug as a result of the extreme turbulence. On the other hand, a lower rate of injection but possibly a larger total quantity of radioactive tracer might be employed when using a continuous injection technique rather than slug injection. Any information that can be gained by determining the time interval between injection and detection is also lost with the use of continuous injection. When using the continuous injection method, however, one does gain the opportunity of taking samples from the system thereby providing a more extended period for radioactivity detection than possible with external detection and the longer the detection period, the greater the accuracy.

In order to describe our invention in greater detail, reference is made to the attached drawings wherein.

Figure 1:
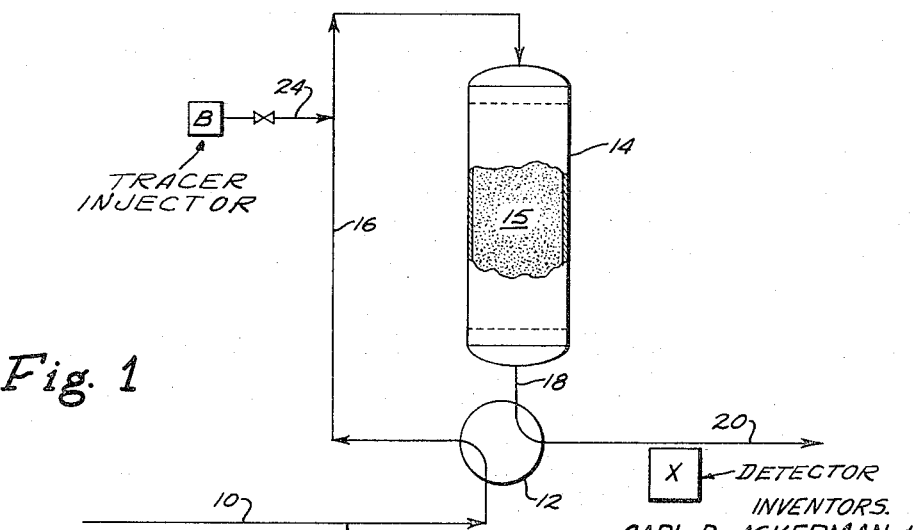
FIGURE 1 is a flow diagram representative of a basic type of a process system.

In the process system of FIGURE 1 the feed stock of line 10 is passed through heat exchanger 12 and then introduced into reactor 14 containing a bed of catalyst 15 by means of line 16. The effluent product is removed from reactor 14 by means of line 18, passed through heat exchanger 12 and then passed to product storage (not shown) by means of line 20. The chemical process system shown in this figure is representative of a wide variety of reactor systems well-known in the art wherein the cool feed stream of line 10 absorbs part of the heat energy contained in the effluent product stream of line 18 by indirect heat exchange in heat exchanger 12 and wherein the feed stream of line 16 is converted to product in reactor 14. Also shown in this figure are valved tracer injector A communicating with line 10 by means of line 22 and valved tracer injector B communicating with line 16 by means of line 24. Positioned adjacent effluent line 20 is detector X.

When it is desired to test for internal leakage or bypassing through heat exchanger 12, radioactive tracer of a type capable of being retained by the catalyst 15 is injected from tracer injector A into line 10 by means of line 22. The desired path in the reactor system takes the feed stock stream of line 10 together with radioactive tracer from injector A through heat exchanger 12, line 16, and into reactor 14. In reactor 14 the radioactive tracer from injector A is completely retained by the catalyst 15 and a tracer-free product effluent is removed from reactor 14 by means of line 18 and then passed through heat exchanger 12 and effluent line 20 to product storage. In such instance no above-background radiation is detected by detector X. In the event that a leak does exist in heat exchanger 12, at least a portion of the tracer containing stream of line 10 introduced into the heat exchanger 12 is leaked through the heat exchanger and into effluent line 20. Any portion of the feed stream of line 10 passing through the heat exchanger 12, line 16, and introduced into reactor 14 will have the tracer from injector A removed by the catalyst 15. In this instance the detection of radioactivity in the effluent stream of line 20 by detector X is indicative of a leak through heat exchanger and the quantity of radioactivity detected is a measure of the quantity of the leak through heat exchanger 12.

When it is desired to test for internal leakage or bypassing within reactor 14, tracer injector B is employed to inject a radioactive tracer of a type capable of being retained by the catalyst 15 through line 24 into the heated feed stream of line 16. The feed stream of line 16 containing the tracer from injector B is introduced into reactor 14 wherein the tracer from injector B is removed from all portions of the feed stream which come in contact with catalyst 15. As the effluent is removed from reactor 14 by means of line 18, passed through the heat exchanger 12 and then through effluent line 20 the detection of any radioactavity by detector X is indicative of internal leakage or bypassing of catalyst 15 within reactor 14 and the quantity of the radioactivity detected is a measure of the extent of internal leakage or bypassing.

Example I

Figure 2:
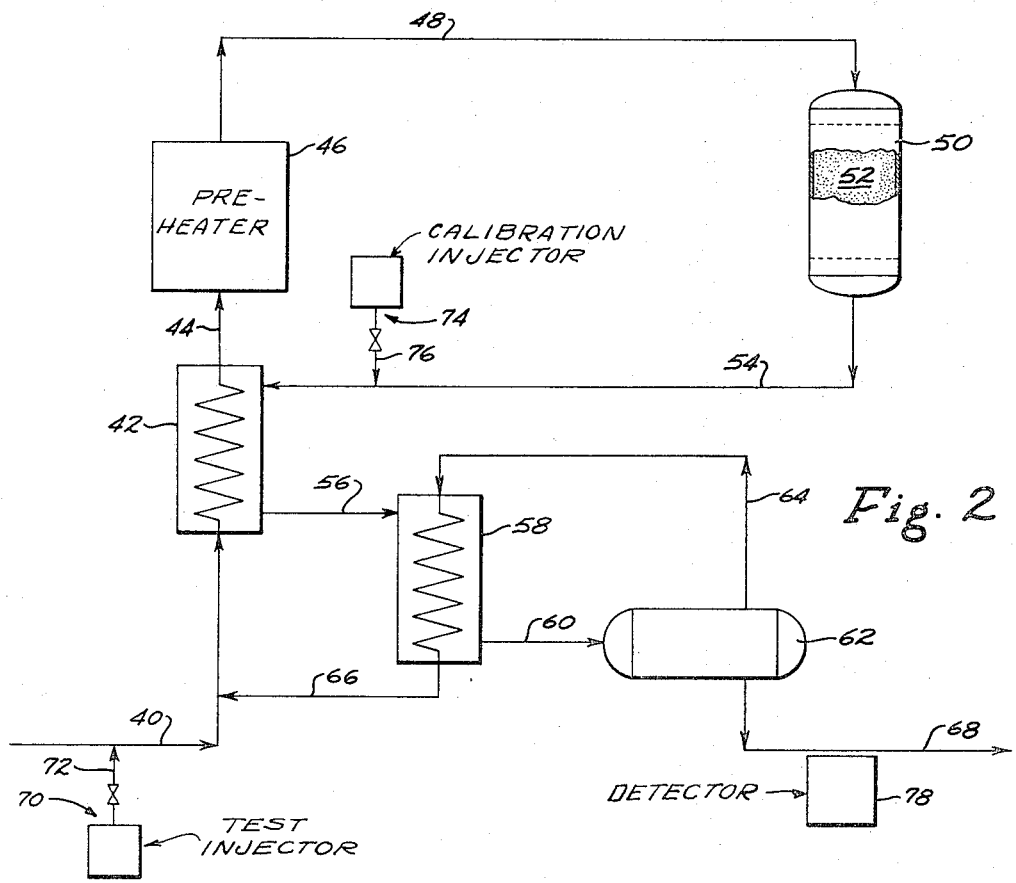
FIGURE 2 is a simplified flow diagram of an actual chemical process system in which the method of our invention has been employed.

In this example the method of our invention was employed to test for suspected internal leakage in a feed-effluent heat exchanger in a naphtha reforming process system employing an arrangement similar to that shown in the simplified diagram of FIGURE 2. In this system, 20,000 b./d. of naphtha feed were charged to the system through line 40. Preheated hydrogen containing recycle gas was introduced into the stream of line 40 by means of line 66 and the combined stream was heat exchanged with the hot effluent in heat exchanger 42 and then passed to preheater 46 by means of line 44 in order to raise the mixed charge stream to reactor temperature. The heated naphtha and recycle gas was then passed by means of line 48 into the top of reactor 50. The catalyst 52 in reactor 50 employed in this process was platinum on alumina. The hot effluent from the reactor 50 was passed by means of line 54 to heat exchanger 42 where it was employed to heat the combined naphtha and recycle gas stream of line 40. The hot effluent was then passed by means of line 56 to heat exchanger 58 where it was employed to heat the recycle gas stream. After leaving heat exchanger 58 by means of line 60, the effluent was introduced into liquid-gas separator 62. The separated gas was removed from separator 62 by means of line 64, passed through heat exchanger 58 and introduced into line 40 by means of line 66. The liquid high octane naphtha product was removed from separator 62 and passed to product storage (not shown) by means of line 68. Also shown in this figure are valved test injector 70 connected to line 40 by means of line 72, valved calibration injector 74 connected to line 54 by means of line 76, and detector means 78 positioned adjacent line 68. The detector means employed in this example was a scintillation counter having a 3-inch diameter by 3 inches long NaI (Tl) crystal as the sensitive element. The output of pulses of this detector was amplified and counted on a conventional scaler. The sensitive element of the counter was surrounded by about a 2-inch thick lead shield in order to reduce the background counting rate to a tolerable level.

The radioactive nuclide selected for employment in this example was bromine-82, inasmuch as it has a half-life (36 hours) long enough to allow for the necessary preliminary handling prior to testing but not sufficiently long to create disposal or contamination problems and it emits gamma radiation of sufficient energy (up to 1.5 mev.) to penetrate steel pipe walls. The particular tagged tracer compound selected for employment was bromobenzene due to the fact that bromobenzene is completely soluble in the naphtha, has a boiling point in the naphtha range (311° F.), is chemically stable in the presence of the feed, does not poison the platinum on alumina catalyst and is readily adsorbed on the catalyst. Thus, bromobenzene meets the criteria of being compatible with the feedstock and completely removable from the process stream, in this instance by the preferred means of the catalyst. The radioactive bromine-82 isotope was obtained as potassium bromide in a water solution. About 400 millicuries of potassium bromide was converted to cuprous bromide, which in turn was subject to the Sandmeyer reaction:

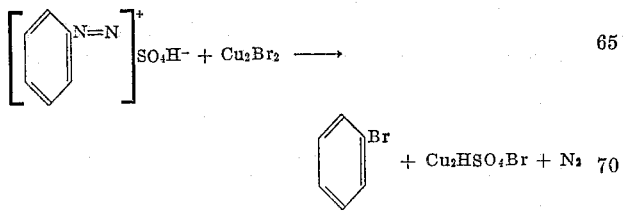

to produce the bromine-82 tagged bromobenzene.

Before installation of the detector 78 adjacent line 68 the detector 78 was roughly calibrated on a mock-up, i.e., a piece of pipe about 3-feet long and about the same diameter and wall thickness as the pipe used in line 68. From data obtained from previous runs in this reactor system a flow rate of 465 gallons per minute was assumed as average flow rate and the calibration factor under the static conditions of the mock-up was found to be about 330 counts per microcurie of radiobromine. When detector 78 was actually mounted adjacent line 68, two separate and essentially identical, additional calibration experiments were performed in advance of the actual leak tests. In each case approximately 860 microcuries of the bromine-82 tagged bromobenzene were injected from valved calibration injector 74 through line 76 and into line 54. The calibration injection was made at this point in this system so as to duplicate as nearly as possible the path of travel and the conditions to which any tracer leaked through exchanger 42 would be subject, particularly to duplicate conditions of decomposition and deposition. The values for the net total count ($n$) accumulated on detector 78 as each of the two tracer waves passed detector 78 in line 68 were recorded. Employing these values for $n$ and the amount of tracer injected ($a$) the calibration factor was calculated from the equation $F = n/a$. The amount of tracer which actually passed detector 78 was calculated from the same equation using the value of $n$ indicated by detector 78 and the previously determined calibration factor of about 330 counts per microcurie of radiobromine obtained with the mock-up. These values are shown in Table I.

TABLE I.—CALIBRATION DATA

| Run No. | Counting Time (Min.) | Net Total Count (n)* | Calibration Factor (Counts/μc)* | Amount of Tracer Actually Passing Detector for 860 μc Injection (μc)* |
|---|---|---|---|---|
| 1 | 27 | 105,700±500 | 123±1 | 320±2 |
| 2 | 28 | 102,259±1,325 | 119±2 | 309±4 |

*Errors are standard deviations due to counting statistics only.

It will be noted that of the original 860 microcuries of bromine-82 tagged bromobenzene injected from calibration injector 74 only about 37 percent reached detector 78. This loss in tracer is due primarily to decomposition an ddeposition on the surface of the system components while passing through heat exchanger 42, line 56, heat exchanger 58, line 60 and liquid gas separator 62. Thus, for each microcurie injected into line 54 approximately 120 counts were obtained at detector 78 rather than the expected 330 counts.

This clearly demonstrates that in practicing the method of our invention it is necessary to calibrate on the actual system to be tested rather than on a laboratory mock-up. As shown in this example the value of the calibration factor obtained with the mock-up varies from the values obtained on the actual system by a factor of about 3. Thus any determination of the quantity of leakage in this example employing the calibration factor obtained from the mock-up would provide a value which varies from the correct value by a factor of about 3. Obviously, such variation is far beyond any tolerable or reasonable degree of experimental error.

From the above data, however, it will be seen that under the conditions existing in this process system a test injection of 14 millicuries injected from test injector 70 through line 72 into line 40 with a 0.1 percent leak through feed-effluent heat exchanger 42 should give about 1700 net counts registered at detector 78 over a period of about 30 minutes. Four separate tests were conducted in which slugs of 14.2, 14.0, 13.7 and 13.4 millicuries of bromine-82 tagged bromobenzene were injected from test injector 70 through line 72 into line 40 at intervals of about one hour. The period of injection in each test was less than 2 seconds.

The total count accumulated on detector 78 in the 20-minute period immediately following each of these four separate injections did not differ significantly from the count attributable to background. In fact, after subtraction of background the largest net count observed was about 200±400, the error being the standard deviation due to counting statistics. On the basis of the calibration data discussed above, it is therefore concluded that leakage, if any, occurring in heat effluent heat exchanger 42 was at a rate which did not even remotely approach 0.1 percent of the naphtha flow rate in the primary stream.

*Example II*

Figure 3:
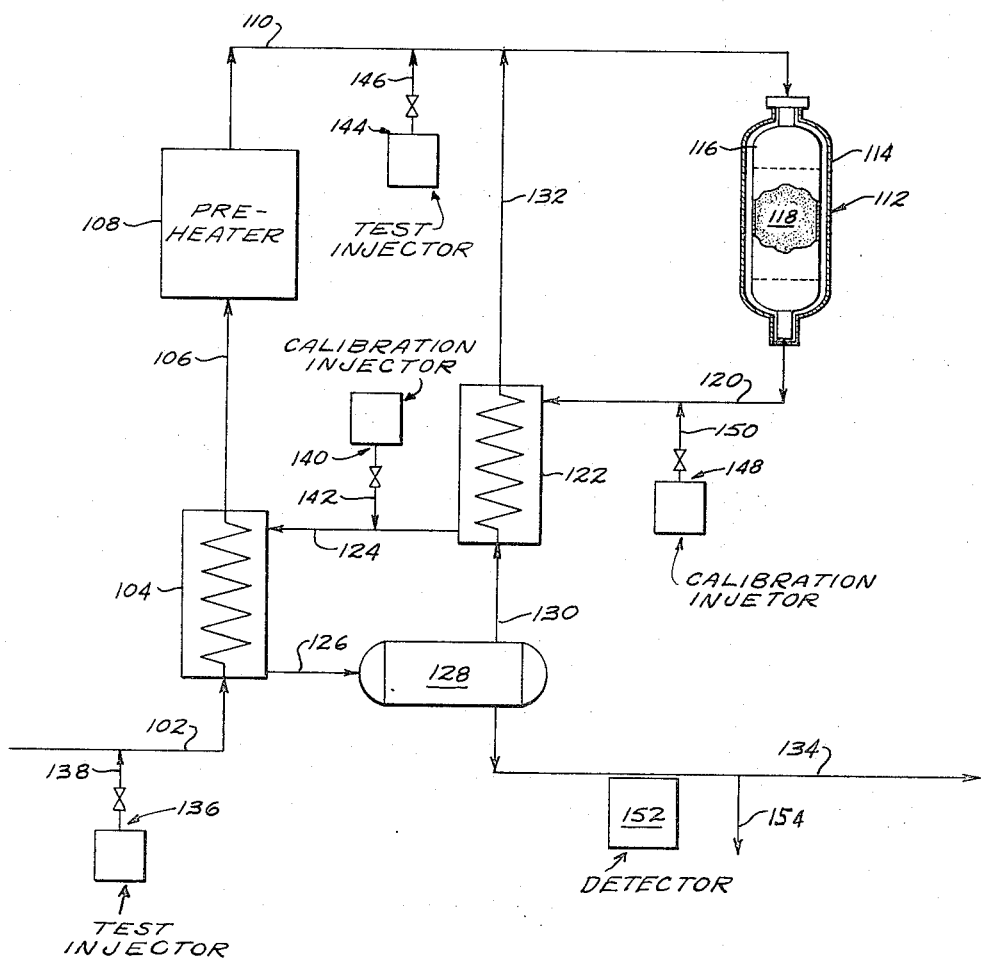
FIGURE 3 is a simplified flow diagram of another chemical process system in which the method of our invention was employed.

In this example tests were conducted in accordance with our invention to determine if and where bypassing or internal leakage was occurring in a naphtha hydrodesulfurization process system. Referring to FIGURE 3 of the drawing, the naphtha charge stock was introduced into the system by means of line 102, passed through feed-effluent heat exchanger 104, preheater 108 and introduced into the top of reactor 112 by means of line 110. As shown in the drawing, reactor 112 is comprised of an outer shell 114 and an inner liner or shroud 116. Contained within the shroud 116 of reactor 112 is a bed of catalyst 118. In this particular process the catalyst 118 was nickel-cobalt-molybdenum on alumina. The effluent stream from reactor 112 was removed by means of line 120 and passed through gas-effluent heat exchanger 122. The effluent stream was then removed from heat exchanger 122 by means of line 124 and passed through feed-effluent heat exchanger 104 (to heat the feed stream of line 102) and line 126 to liquid-gas separator 128. The gaseous hydrogen containing phase separated in separator 128 was removed therefrom by means of line 130, passed through heat exchanger 122 (where it was heated by the effluent stream), line 132 and introduced into line 110. The desulfurized product naphtha was removed from separator 128 by means of product removal line 134 and passed to product storage (not shown). Also shown in FIGURE 3 are valved test injector 136 connected to line 102 by means of line 138, valved calibration injector 140 connected to line 124 by means of line 142, valved test injector 144 connected to line 110 by means of line 146, valved calibration injector 148 connected to line 120 by means of line 150 and detector means 152 disposed adjacent product removal line 134. Calibration injectors 140 and 148 are connected to the system to be employed in calibrating for leak testing of heat exchanger 104 and reactor 112, respectively. A comparison of pilot plant data versus actual refinery results obtained with the system of this example indicated incomplete desulfurization, and internal leakage or bypassing was suspected.

The radioactive tracer employed in the tests of this example was bromine-82 tagged bromobenzene prepared in the same general manner as in Example I. The reasons for selecting this particular tracer are the same as stated in Example I and can be summarized as compatibility with the feed and the capability of being completely removed from the process stream by the catalyst. Initially, 338 microcuries of bromine-82 tagged bromobenzene were injected from calibration injector 140 through line 142 into line 124 during an interval of less than 2 seconds. The total number of counts obtained at detector 152 were recorded and the calibration factor (F) was calculated as described in Example I. Next, 6500 microcuries of bromine-82 tagged bromobenzene were injected from test injector 136 through line 138 and into line 102 during an interval of less than 2 seconds. It was observed that the time interval between injection from injector 136 until initial detection at detector 152 was 680 seconds, whereas the time interval between the calibration injection from injector 140 until initial detection at detector 152 was only 320 seconds. This excluded the possibility of direct leakage of tracer containing feed stream through feed-effluent exchanger 104 and required that the radiotracer from the test injection must have traveled a more circuitous route between the injector 136 and the detector 152. The next step was to test the reactor 112 for leakage or bypassing. This was accomplished by first making two separate calibration injections of 382 microcuries each of bromine-82 tagged bromobenzene from injector 148 through line 150 and into line 120, each during an interval of less than 2 seconds. Again, the total number of counts at detector 152 were recorded for each calibration injection. The first calibration injection produced 247,760 counts at detector 152 while the second injection produced 226,132 counts. From the equation $F=n/a$, wherein F is the calibration factor, $n$ is the number of counts detected and $a$ is the amount of radioactive tracer injected, the calibration factor for each of the injections was determined (648.3 and 592.0). The average of the two (620.2) was employed as the calibration factor for the leak testing. The reactor 112 was then tested for leakage by injecting 7170 microcuries ($A_o$) of bromine-82 tagged bromobenzene from injector 144 through line 146 and into line 110 during an interval of less than 2 seconds. This resulted in an above-background count (N) of 37,660 at detector 152. Inasmuch as any bromine-82 tagged bromobenzene contacting the catalyst 118 would have been retained on the catalyst and thus removed from the process stream the detection of radioactive material by detector 152 indicated that a bypassing of the bed of catalyst 118 existed. From the calibration factor ($F=620.2$) just obtained and the number of counts ($N=37,660$) detected, the amount of tracer present in the stream of line 134 (A) is indicated by the relationship $A=N/F$ and the extent of the leak is represented by the relationship $$\frac{Q}{Q_o}=\frac{A}{A_o}$$

wherein Q is the leak rate, $Q_o$ is the flow rate of the feed stream of line 110, A is the amount of tracer detected in line 134 and $A_o$ is the amount of tracer injected from injector 144. Furthermore, the ratio $A/A_o$ can be expressed as the percent leakage. Finally, knowing the quantity of tracer being injected and calibrating the detector as indicated by the calibration factor, the detector can be scaled to read the percent of feed bypassing a portion of the system in accordance with the equation $$\frac{N/F}{A_o}\times 100 = \text{percent of total feed } (Q_o) \text{ leaking}$$

In this example the data indicated that bypassing amounted to at least about 0.8 percent of the entire feed to the reactor.

$$\left(\frac{37,660/620.2}{7170}\times 100=0.847\%\right)$$

This evidence warranted opening the reactor in order to perform a physical examination for leakage. Upon opening the reactor it was discovered that a leak existed in the shroud 116 of the reactor and that a significant portion of the feed stream entering the top of the reactor 112 was passing through the annular space defined between the outer shell of the reactor 114 and the shroud 116, thereby bypassing the catalyst 118 and leaving the reactor through line 120 in a still unprocessed state.

*Example III*

In this example continuous injection of radioactive tracer is employed in the testing for internal leakage in the process system described in Example II and shown in FIGURE 3 rather than the injection of a discrete slug as employed in the preceding examples. When employing the continuous injection technique of this example, knowledge of the total amount of tracer injected is not essential, as in Examples I and II, but rather the rate of injection is important. Similarly, the total count obtained at the detector is less important but the counts detected per unit of time are essential. Furthermore, having previously determined, in Example II, that the leak in this system would appear to be in reactor 112, this example is restricted to leak testing of the reactor 112.

After the reactor system has reached equilibrium, bromine-82 tagged bromobenzene is injected from valved calibration injector 148 through line 150 and into line 120 at the rate of 75 microcuries per minute. A short period of time is allowed to elapse so that the flow rate of the tracer through heat exchanger 122, line 124, heat exchanger 104, line 126, separator 128 and line 134 can stabilize. Recording of the number of counts per minute detected by detector 152 is then commenced and continued for about 3 minutes, after which time the recording and injection are discontinued. The average number of counts per minute is then determined, in this instance 59,250 counts per minute, and the calibration factor is obtained from the relationship employed in the preceding examples, $F=n/a$. In the particular application of this example, however, $n$ is the average number of counts per minute and $a$ is the rate of injection of tracer expressed in microcuries per minute rather than the total number of counts and the total amount of tracer injected, as in Examples I and II. Thus, from the values given above, the calibration factor is 790.

Next, bromine-82 tagged bromobenzene is injected from valved test injector 144 through line 146 and into line 110 at the rate of 2 millicuries per minute. Again a period of time, somewhat longer than the period of time used in the calibration step, is allowed to elapse so that the flow rate of the tracer through line 110, reactor 112, line 120 and the remainder of the system mentioned above can stabilize. Recording of the number of counts per minute detected by detector 152 is then commenced and continued for about 3 minutes. The average number of counts (N) is then determined, in this test 11,850 counts per minute, and with the calibration factor (F) obtained from the calibration procedure above the value of the amount of radioactive tracer passing detector 152 (A) is indicated through the relationship $F=N/A$. In this particular example the value for A is 15 microcuries. In substantially the same manner as described in Example II, the ratio of the rate of detection of radioactive tracer to the rate of injection of radioactive tracer $(A/A_o)$ represents the percent leakage through reactor 112. In this example the percent leakage indicated is 0.75 percent.

*Example IV*

In this example the same technique of continuous injection is used as employed in Example III with the exception, however, that the quantity of radioactive tracer in the effluent product stream is not detected by means of external detector 152; instead a sample is removed from the stream of line 134 and the radioactivity of the sample is determined.

Thus, to calibrate, after the system has reached equilibrium, bromine-82 tagged bromobenzene is injected from valved calibration injector 148 through line 150 and into line 120 at the rate of $2.2\times10^{-4}$ microcuries per ml. A short period of time is allowed to elapse so that the flow rate of the tracer through heat exchanger 122, line 124, heat exchanger 104, line 126, separator 128 and line 134 can stabilize. A 100 ml. sample of effluent is then removed from line 134 by means of line 154 and the total number of above-background counts ($2.94\times10^5$ counts/hour at 10 percent counting efficiency) detected from this sample during a one-hour period is recorded. The calibration factor is then obtained from the relationship employed in the preceding example, $F=n/a$. In the particular application of this example, however, $n$ is the total number of counts per unit of sample and $a$ is the quantity of radiobromine injected per unit volume of the process stream flowing through line 120. Thus, from the values given above the calibration factor is $1.3\times10^9$ counts per hour per microcuries per ml.

Next bromine-82 tagged bromobenzene is injected from valved test injector 144 through line 146 and into line 110 at the rate of $3.9\times10^{-4}$ microcuries per ml. of flow through line 110. Again a period of time, somewhat longer than the period of time used in the calibration step, is allowed to elapse so that the flow rate of the tracer through line 110, reactor 112, line 120 and the remainder of the system mentioned above can stabilize. A 100 ml. sample is then removed from line 134 by means of line 154 and the total number of counts detected from the sample during a ten-hour period is recorded. In this example the total number of above-background counts (N) is 40,000. With the calibration factor (F) obtained from the calibration procedure above the amount of radioactive tracer present in the sample (A) is indicated through the relationship $F=N/A$. In this particular example the value for A is $3.1\times10^{-6}$ microcuries per ml. In substantially the same manner as in Examples II and III the ratio of the quantity of radioactive tracer detected per unit volume of sample to the rate of injection of radioactive tracer per unit volume of the charge stream of line 110 $(A/A_o)$ represents the percent leakage through reactor 112. In this example the percent leakage is 0.8 percent.

The advantage which is gained through the technique of removing a sample from the product stream over the technique of external detection, shown in Examples I through III, is that a much lower quantity or concentration of gamma emitting tracer can be employed inasmuch as the absorbing effect of the steel pipes, etc., does not have to be overcome. Thus, the radiation hazard is reduced and the problem of product contamination is lessened. Furthermore, by removing the sample from the system it is no longer necessary to employ a gamma emitter to penetrate the walls of the system but other radioactive nuclides such as a pure beta emitter can be employed thereby widening the scope of tracers which can be employed in our invention. In addition, when employing the sample removal technique in the method of our invention, a much longer period of detection is provided. With external detection the count obtained is limited to that detected as the radioactive tracer passes through that portion of the line immediately adjacent the detector; whereas, when the sample has been removed from the effluent stream the period of detection is increased from fractions of a second up to a period of many hours, e.g., 1 to 24 hours. Due to this prolonged period of detection the statistical error in counting is reduced substantially thereby providing a greater degree of accuracy.

We claim:

1. A method of measuring internal leakage in a feed-effluent heat exchanger of a continuous stream chemical process system, which process stream is passed successively through the feed side of the exchanger, another portion of the system and the effluent side of the exchanger, which method comprises injecting a first quantity ($a$) of a radioactive tracer of known radioactivity into the process stream at a first point downstream of the feed side of the exchanger and immediately upstream of the effluent side of the exchanger, thereby simulating leakage through the exchanger, detecting the counts ($n$) due to the injected radioactive tracer at a point of the process stream downstream of the effluent side of the exchanger to provide the calibration factor (F) represented by the relationship $F=n/a$, injecting into the process stream upstream of the feed side of the exchanger a second quantity of the radioactive tracer ($A_o$), removing the tracer from the process stream at a second point downstream of the feed side of the exchanger and upstream of the first point of injection and the effluent side of the exchanger, detecting the counts (N) at the point of the process stream downstream of the effluent side of the exchanger, thereby indicating the quantity of radioactive tracer present in the process stream downstream of the exchanger (A) represented by the relationship $A=N/F$, and determining the amount of internal leakage in the heat exchanger according to the equation $$\frac{A}{A_o} \times 100 = \text{percent leakage}$$

2. A method of measuring bypassing in a processing vessel of a continuous stream chemical process system, which vessel has an inlet and an outlet, which method comprises injecting a first quantity ($a$) of a radioactive tracer of known radioactivity into the effluent stream from the outlet of the reaction vessel at a first point proximate the outlet thereby simulating bypassing in the vessel, detecting the counts ($n$) due to the injected radioactive tracer in the effluent at a second point removed from the outlet and downstream from the first point of injection to provide the calibration factor (F) represented by the relationship $F = n/a$, injecting into the feed stream to the processing vessel a second quantity of the radioactive tracer ($A_o$) passing the feed stream together with the tracer into the inlet of the processing vessel, retaining the radioactive tracer and its reaction products in the processing vessel, removing effluent from the outlet of the processing vessel, detecting the counts (N) at the second point of the effluent thereby indicating the quantity of radioactive tracer present in the effluent (A) represented by the relationship $A = N/F$, and determining the amount of bypassing in the vessel according to the equation $$\frac{A}{A_o} \times 100 = \text{percent bypassing}$$

3. A method of measuring bypassing in a continuous stream process system without removing a sample of the stream from the process system which comprises injecting into the process stream upstream of a point of possible bypassing a known quantity of a radioactive halogen tagged tracer, removing the radioactive tracer from the process stream flowing through that portion of the system possibly being bypassed by contacting the process stream with a halogen adsorptive material, and detecting externally of the system the quantity of radioactivity of the process stream downstream from the point of possible bypassing; whereby the quantity of radioactivity detected is indicative of the extent of bypassing.

4. A method of measuring internal leakage in a feed-effluent heat exchanger of a continuous stream chemical process system without removing a sample of the stream from the process system, which process stream is passed successively through the feed side of the exchanger, another portion of the system and the effluent side of the exchanger, which method comprises injecting into the process stream upstream of the feed side of the exchanger a known quantity of bromine-82 tagged bromobenzene which is compatible with the process stream and is capable of being removed from the process stream, removing the bromine-82 tagged bromobenzene from the process stream at a point downstream of the feed side of the exchanger and upstream of the effluent side of the exchanger by contacting the process stream with an alumina supported catalyst, and detecting externally of the system the quantity of radioactivity of the process stream downstream of the effluent side of the exchanger; whereby the quantity of radioactivity detected is indicative of the extent of internal leakage.

5. A method of measuring bypassing in a processing vessel of a continuous stream chemical process system, which vessel has an inlet and an outlet, without removing a sample from the effluent from the vessel outlet, which method comprises injecting into the feed stream to the processing vessel a known quantity of bromine-82 tagged bromobenzene which is compatible with the feed stream and which bromine-82 tagged bromobenzene and its reaction products are capable of being completely retained in the processing vessel, passing the feed stream together with the bromine-82 tagged bromobenzene into the inlet of the processing vessel, retaining the bromine-82 tagged bromobenzene and its reaction products in the processing vessel by contacting the process stream with an alumina supported catalyst within the reaction vessel, removing effluent from the outlet of the processing vessel and detecting externally of the system the quantity of radioactivity of the effluent; whereby the quantity of radioactivity detected is indicative of the extent of bypassing.

References Cited

UNITED STATES PATENTS

| 2,826,700 | 3/1958 | Hull | 250—106 |
| 3,087,064 | 4/1963 | Curtice et al. | 250—43.5 X |
| 3,124,688 | 3/1964 | Stalker | 250—106 |

OTHER REFERENCES

Wagner: Tracers Locate Entrainment, Nucleonics, April 1956, vol. 14, No. 4, pp. 78 to 83.

RALPH G. NILSON, *Primary Examiner.*

S. ELBAUM, *Assistant Examiner.*

UNITED STATES PATENT OFFICE
CERTIFICATE OF CORRECTION

Patent No. 3,370,173                      February 20, 1968

Carl D. Ackerman et al.

It is certified that error appears in the above identified patent and that said Letters Patent are hereby corrected as shown below:

Column 4, line 32, "bromide-82" should read -- bromine-82 --; line 34, "or" should read -- on --; line 74, "compoudn" should read -- compound --. Column 5, line 4, "amounts" should read -- counts --. Column 7, line 13, "reactor" should read -- reaction --. Column 8, TABLE I, third column, line 2 thereof, "102,269" should read -- 102,260 --; line 44, "ddeposition" should read -- deposition --.

Signed and sealed this 29th day of July 1969.

(SEAL)
Attest:

Edward M. Fletcher, Jr.                    WILLIAM E. SCHUYLER, JR.
Attesting Officer                          Commissioner of Patents